US012765448B2

(12) United States Patent
Rommedahl et al.

(10) Patent No.: US 12,765,448 B2
(45) Date of Patent: Oct. 20, 2026

(54) OUTPUT UNIT, AGRICULTURAL IMPLEMENT COMPRISING A PLURALITY OF SUCH OUTPUT UNITS AND METHOD OF OPERATING AN AGRICULTURAL IMPLEMENT

(71) Applicant: Väderstad Holding AB, Väderstad (SE)

(72) Inventors: Rune Rommedahl, Ljungsbro (SE); Crister Stark, Väderstad (SE); Bengt Sandberg, Vikingstad (SE)

(73) Assignee: Väderstad Holding AB, Väderstad (SE)

( * ) Notice: Subject to any disclaimer, the term of this patent is extended or adjusted under 35 U.S.C. 154(b) by 345 days.

(21) Appl. No.: 18/287,695

(22) PCT Filed: Apr. 22, 2022

(86) PCT No.: PCT/SE2022/050392

§ 371 (c)(1),
(2) Date: Oct. 20, 2023

(87) PCT Pub. No.: WO2022/225443

PCT Pub. Date: Oct. 27, 2022

(65) Prior Publication Data

US 2024/0188481 A1 Jun. 13, 2024

(30) Foreign Application Priority Data

Apr. 23, 2021 (SE) .................................. 2150519-3

(51) Int. Cl.
*A01C 7/20* (2006.01)
*A01C 5/06* (2006.01)

(52) U.S. Cl.
CPC .............. *A01C 7/203* (2013.01); *A01C 5/064* (2013.01); *A01C 7/206* (2013.01); *A01C 5/068* (2013.01)

(58) Field of Classification Search
CPC .................... A01C 7/20–206; A01C 5/06–068
See application file for complete search history.

(56) References Cited

U.S. PATENT DOCUMENTS 1,747,525 A 2/1930 Nagy
3,797,418 A * 3/1974 Bridger, Jr. ............ A01C 7/006 111/140

(Continued)

FOREIGN PATENT DOCUMENTS

CA 3014327 A1 8/2017
CA 3050813 A1 3/2020

(Continued)

*Primary Examiner* — Tara Mayo
(74) *Attorney, Agent, or Firm* — COATS & BENNETT, PLLC

(57) ABSTRACT

An output unit (21*a*, 21*b*) for an agricultural implement (1), for feeding granular material to the ground on which the agricultural implement (1) is travelling, comprises a seed furrow-opener (2111), a depth regulator (212), for controlling a working depth for the seed furrow-opener (2111), and a material outlet (213) defining a delivery point at which the granular material leaves the material outlet (213). The material outlet (213) is moveable relative to the seed furrow-opener (2111), so that the delivery point is moveable at least vertically relative to the seed furrow-opener (2111) and has a setting device (216), for controlling or limiting a height position for the delivery point relative to the seed furrow-opener (2111).

17 Claims, 7 Drawing Sheets

(56) References Cited

U.S. PATENT DOCUMENTS

| | | | | |
|---|---|---|---|---|
| 4,374,500 | A * | 2/1983 | Westerfield | A01C 5/06 111/194 |
| 4,760,806 | A | 8/1988 | Bigbee et al. | |
| 5,158,411 | A | 10/1992 | Kemmner | |
| 5,234,060 | A * | 8/1993 | Carter | A01B 63/22 172/260.5 |
| 5,595,130 | A | 1/1997 | Baugher et al. | |
| 5,829,535 | A | 11/1998 | Line | |
| 6,148,747 | A * | 11/2000 | Deckler et al. | A01C 7/203 111/164 |
| 10,542,655 | B2 | 1/2020 | Kovach et al. | |
| 10,952,368 | B2 | 3/2021 | Horsch | |
| 2007/0272134 | A1* | 11/2007 | Baker et al. | A01C 5/064 111/163 |
| 2008/0308020 | A1 | 12/2008 | Ryder et al. | |
| 2011/0282556 | A1* | 11/2011 | Klenz et al. | A01C 7/203 701/50 |
| 2011/0284252 | A1 | 11/2011 | Friggstad et al. | |
| 2012/0048160 | A1 | 3/2012 | Adams et al. | |
| 2013/0319700 | A1 | 12/2013 | Maschio | |
| 2016/0165789 | A1* | 6/2016 | Gervais et al. | A01C 7/205 700/275 |
| 2017/0251587 | A1 | 9/2017 | Sporrer et al. | |
| 2018/0249621 | A1 | 9/2018 | Horsch | |
| 2019/0150350 | A1 | 5/2019 | Engel et al. | |
| 2020/0060073 | A1 | 2/2020 | Schilling et al. | |
| 2020/0060074 | A1 | 2/2020 | Schilling et al. | |
| 2020/0329623 | A1 | 10/2020 | Connors et al. | |
| 2020/0337211 | A1 | 10/2020 | Hertzog et al. | |
| 2020/0352081 | A1 | 11/2020 | Arnett et al. | |
| 2020/0352101 | A1 | 11/2020 | Pierson et al. | |
| 2020/0383260 | A1 | 12/2020 | Foster et al. | |
| 2021/0084804 | A1 | 3/2021 | Stanhope et al. | |

FOREIGN PATENT DOCUMENTS

| | | | |
|---|---|---|---|
| DE | 102007028193 | A1 | 12/2008 |
| EP | 2301315 | A1 | 3/2011 |
| WO | 9955137 | A1 | 11/1999 |
| WO | 2010138068 | A1 | 12/2010 |
| WO | 2012125109 | A1 | 9/2012 |
| WO | 2020232342 | A1 | 11/2020 |
| WO | 2021080494 | A1 | 4/2021 |

* cited by examiner

Fig 6a
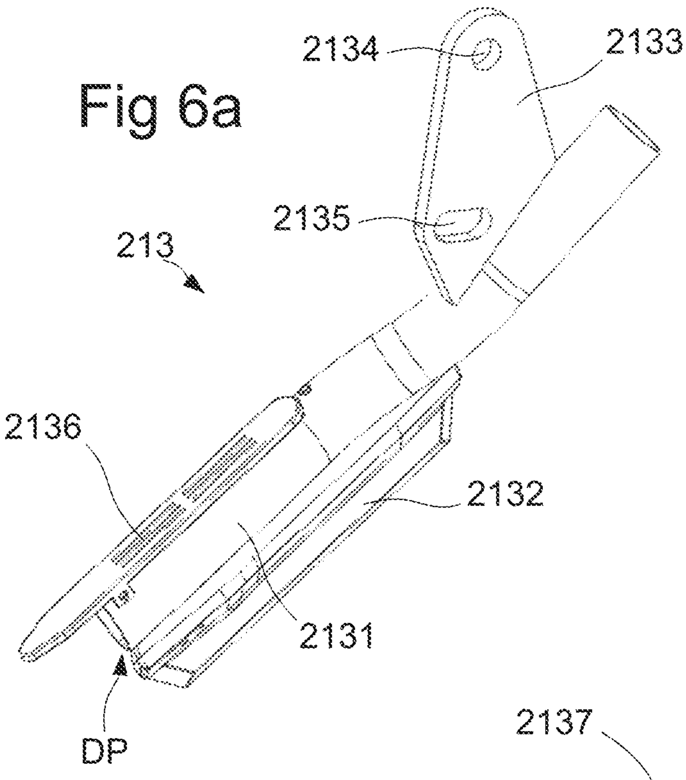
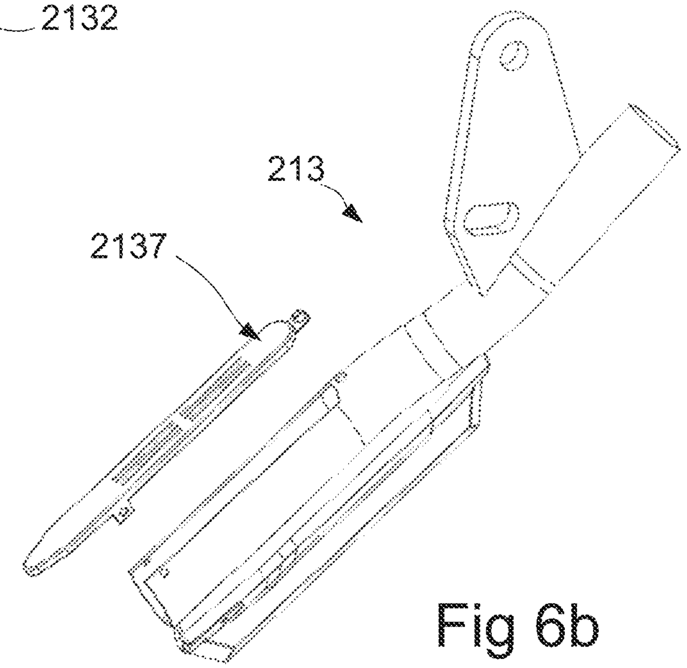
Fig 6b
Fig 7a
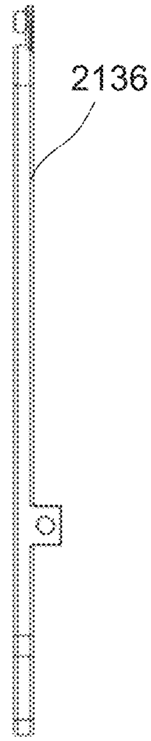
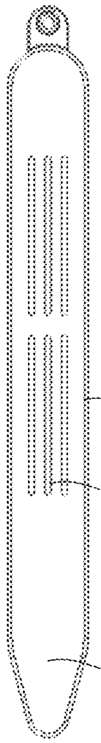
Fig 7b

Fig 8a
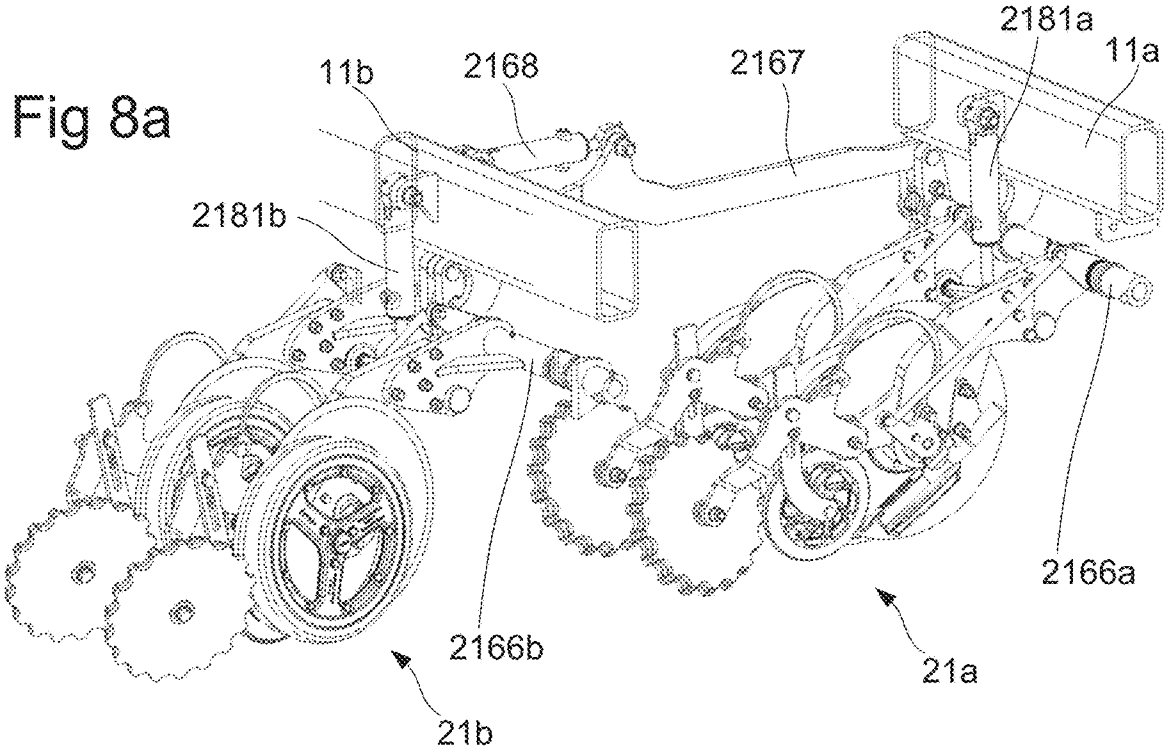
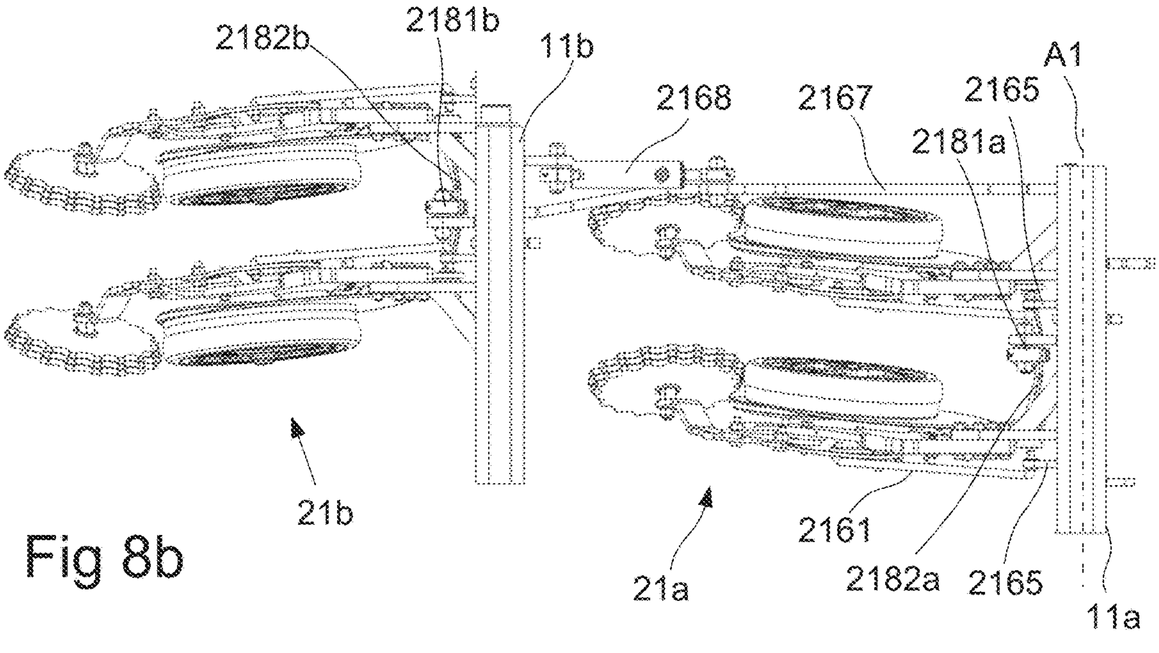
Fig 8b

OUTPUT UNIT, AGRICULTURAL IMPLEMENT COMPRISING A PLURALITY OF SUCH OUTPUT UNITS AND METHOD OF OPERATING AN AGRICULTURAL IMPLEMENT

TECHNICAL FIELD

This document discloses an output unit, such as a furrow opener or a row unit, for an agricultural implement, an agricultural implement comprising a plurality of such output units and a method of operating an agricultural implement.

The concepts shown in this document are used in particular in connection with setting the work depth working depth for output units of the agricultural implement.

BACKGROUND

Agricultural implements for sowing, which comprise a plurality of output units, such as row units or furrow openers, which each may comprise a seed furrow-opener, a depth regulator, a sowing tube and a seed furrow-sealer, are known. Such agricultural implements can also comprise any form of pressure means for pressing down seed placed in an opened seed furrow.

Such output units are common in so-called "precision seed drills" or "planters", i.e. seed drills which place each seed at a predetermined distance from the adjacent seed, but also in seed drills with volumetric output, i.e. seed drills being used for cereals.

It is desirable to provide output units that are compact, viewed in the transverse direction of the agricultural implement, especially in seed drills with volumetric output which are used for sowing crops that can be placed at a small distance between the seed rows.

It is also desirable to be able to control the drilling depth with good precision. It is known to control the drilling depth by setting the vertical position of a depth regulator in a certain relationship to the vertical position of a seed furrow-opener. In addition, it is known to set the drilling depth by controlling the force with which the seed furrow-opener is pressed to the ground.

It is further desirable to be able to quickly set the drilling depth even for a large machine with a large number of output units.

Furthermore, it is desirable to be able to set the drilling depth while the agricultural implement is operated, for example when sowing is in progress, in order to be able to manage variations in the bearing capacity of the earth across the area where sowing is taking place.

Moreover, it is desirable to be able to set the drilling depth for individual output units or groups of output units.

In addition, it is desirable to be able to control the drilling depth when sowing is in progress so that the drilling depth is substantially constant even when the hardness of the ground varies.

It is also desirable that as many settings as possible can be made automatically, for example controlled remotely from a driving cab or from a control centre, or autonomously by a control and adjusting system.

One solution for setting the drilling depth of a row unit is known from DE102007028193A1. However, the row unit disclosed therein takes up a great deal of space, not least in the transverse direction of the agricultural implement. Besides, the solution is very complex and therefore expensive to manufacture and difficult to maintain.

Consequently, there is a need for an improved output unit whose drilling depth can be reset during operation of the agricultural implement, and whose setting can be optimized to provide a good balance between output precision, wear and required power during travel.

SUMMARY

One object of this document is thus to provide an improved output unit, and in particular an output unit whose drilling depth can be set during operation of the agricultural implement, and which can be manufactured at a lower cost.

A further object is to provide an output unit whose drilling depth can be continuously controlled in relation to the hardness of the ground.

The invention is defined by the attached independent patent claims. Embodiments are set forth in the attached dependent patent claims, in the description that follows and in the accompanying drawings.

According to a first aspect, an output unit for an agricultural implement, for feeding granular material to the ground on which the agricultural implement is travelling, is provided, comprising a seed furrow-opener, a depth regulator, for controlling a work depth working depth for the seed furrow-opener, and a material outlet defining a delivery point at which the granular material leaves the material outlet. The output unit is characterized in that the material outlet is moveable relative to the seed furrow-opener, so that the delivery point is moveable at least vertically relative to the seed furrow-opener, and a setting device, for controlling or limiting a height position for the delivery point relative to the seed furrow-opener.

The output unit can be a sowing unit, a row unit or similar.

The seed furrow-opener can comprise one or more disc tools, such as a single or a double disc share, or a fixed seed furrow-opener, such as a towing share, cutter share, blade share or cultivator share or similar, or a combination thereof.

The depth regulator can comprise a depth regulating gauge wheel, or another corresponding part for such contact against the ground so that a portion of the ground contact force of the output unit is taken up and the penetration of the seed furrow-opener into the ground is limited.

A delivery point is the point of the material outlet where the effect on the material by the material outlet ceases, so that the material falls freely, possibly under the action of an air stream from the material outlet.

Here, "setting device" means a device which allows regulating the height position of the delivery point at a distance from the material outlet.

By being able to control the height position of the delivery point, it is possible to optimize the feeding of the material to the ground to reduce the risk that the material bounces or in any other way is moved away from its intended placement.

By adjusting the position of the delivery point relative to the seed furrow-opener it is possible to ensure that the material lands correctly at a small working depth, and thus a narrow seed furrow, by then positioning the delivery point closer to the bottom of the seed furrow, but also avoiding too great an effect on the material outlet at a great working depth, which is associated with a wider seed furrow.

By controlling the height position of the material outlet it is also possible to reduce wear on the material outlet, by raising it, so that it does not engage with the ground when it is not necessary. This can also contribute to reducing energy consumption, since the need of traction force is reduced when the material outlet does not engage with the ground.

The depth regulator can be moveable relative to the seed furrow-opener, so that the working depth is adjustable.

The setting device can be configured to also simultaneously set a height position for the depth regulator relative to the seed furrow-opener and to control or limit said height position for the delivery point.

The setting of the height position of the depth regulator relative to the seed furrow-opener, and thus the working depth of the seed furrow-opener, can also be performed in a synchronized manner, such as in the same movement with, said controlling or limiting of the height position of the delivery point.

The setting device can comprise a setting part which is pivotable about a setting axis.

The output unit can further comprise a setting link, which is connected to a portion of the setting part located at a distance from the setting axis, so that a torque about the setting axis is applicable using a force along the setting link.

The material outlet can be moveably attached relative to a unit frame and wherein the material outlet is freely moveable relative to the unit frame within a limited movement range.

"Freely moveable" means that the material outlet is moveable without the effect of any actuator.

The setting part can be configured to limit said movement range at least in one direction.

The material outlet can be biased to the setting part.

The setting part can have a cam surface, wherein the movement of the material outlet in at least one direction relative to the unit frame is limited by contact against the cam surface, and wherein a distance between the setting axis and a portion of the cam surface, contacting the material outlet, is variable by pivoting the setting part.

The material outlet can be pivotably attached relative to a unit frame.

The seed furrow-opener can comprise a seed disc, rotatably supported on the unit frame.

The depth regulator can comprise a gauge wheel which can be rotatably supported on a gauge arm, which is pivotable using the setting axis.

The output unit can further comprise a pressure device, which is arranged directly behind the material outlet, viewed in the direction of travel, to receive and/or press the material to the ground.

The pressure device can comprise a press wheel, which can be rotatably supported on the press wheel arm. The press wheel arm can be pivotably attached relative to the unit frame.

The pressure device can be connected to the setting device, preferably via a resilient link, so that a position for the pressure device is adjustable.

Accordingly, the position of the pressure device relative to the unit frame is also adjustable as a function of the position of the material outlet.

The output unit can further comprise a sealer, which is arranged behind the material outlet, viewed in the direction of travel, to cover material fed via the material outlet.

The sealer can comprise a sealing wheel, which can be rotatably supported on a sealing arm. The sealing arm can be pivotably attached relative to the unit frame.

The sealer can be connected to the setting device, preferably via a resilient link, so that a position for the sealer is adjustable.

Accordingly, the position of the sealer relative to the unit frame can also be adjustable as a function of the position of the material outlet.

The pressure device and the sealer can be fixedly arranged relative to each other.

The material outlet can comprise a pipe with a wear-resistant cutting blade extending along at least an underside of the pipe, preferably along a front and/or an underside thereof.

One function of the wear-resistant cutting blade can be to ensure that the seed furrow, formed by the seed furrow-opener, is kept open so that the material can be placed therein. The cutting blade can also engage with the ground which has been opened, but already collapsed again, or with ground which has not yet been reached by the seed furrow-opener, to ensure that the seed furrow is sufficiently open for the material.

The material outlet can have a cam surface extending along an opposite side to the cutting blade of the pipe.

The pipe can have an orifice defining the delivery point and a control part extending past the orifice.

The control part can extend past the orifice from an upper side of the orifice.

The material outlet can have a ventilation opening.

The ventilation opening can be arranged upstream of the delivery point and can be configured as one or more longitudinal slots, which can each have a width below a minimum dimension of the granular material.

The material outlet can have a mounting arrangement, through which the material outlet can be mounted so that the material outlet is pivotable over a limited angular interval.

The setting device can be configured to set the material outlet so that the delivery point is positioned closer to a seed furrow bottom at a smaller working depth than at a greater working depth.

According to a second aspect an agricultural implement is provided comprising an implement frame and a plurality of output units, which is moveably arranged along at least one transverse frame portion of the implement frame.

The agricultural implement can further comprise a depth control arrangement arranged on the implement frame, wherein the setting device of the respective output unit is operatively connected to the depth control arrangement, so that the height position of the delivery point is adjustable in a synchronized manner for a plurality of said output units.

The depth control arrangement can comprise a control shaft pivotably arranged, which is connected to the respective setting device, so that pivoting of the control shaft is transferred to the respective setting device.

In the agricultural implement, the respective setting part can be connected to the control shaft, so that pivoting the control shaft causes pivoting of the setting part.

The implement frame can comprise a front transverse frame portion supporting a front output unit, and a rear transverse frame portion supporting a rear output unit, and a mechanical connection between the setting device of the front output unit and the setting device of the rear output unit, so that the front output unit and said rear output unit are controllable by means of the same actuator.

The agricultural implement can comprise a front control shaft extending along the front transverse frame portion and a rear control shaft extending along the rear transverse frame portion, wherein the mechanical connection comprises a control link arm fixedly arranged on the front control shaft, a control link arm fixedly arranged on the rear control shaft and a control link extending between distal portions of the control link arms.

The agricultural implement can comprise a pair of output units being arranged side by side along one of the transverse frame portions, a transverse link connecting the output units and a ground pressure actuator acting between the transverse frame portion and the transverse link, so that the ground pressure of said pair of output units is controllable using the ground pressure actuator.

The transverse link can be attached to the respective output unit using a joint allowing tilting between the output unit and the transverse link as well as relative movement in a direction along the transverse link.

According to a third aspect, a method of operating an agricultural implement is provided, comprising providing an output unit for feeding granular material to the ground on which the agricultural implement is travelling, which comprises a seed furrow-opener, a depth regulator, for controlling a working depth for the seed furrow-opener, and a material outlet defining a delivery point at which the granular material leaves the material outlet. The method comprises controlling or limiting a position and/or orientation of the material outlet relative to the seed furrow-opener, and thus a height position for the delivery point relative to the seed furrow-opener.

Controlling or limiting a position and/or orientation of the material outlet relative to the seed furrow-opener can comprise setting the material outlet so that the delivery point is positioned closer to a seed furrow bottom at a smaller working depth than at a greater working depth.

Controlling or limiting a position and/or orientation of the material outlet relative to the seed furrow-opener can comprise limiting a movement range of the material outlet in at least one direction.

Said height position for the delivery point can be provided at least partly under the action of the ground on the material outlet.

The material outlet can thus be freely moveably attached relative to the unit frame within a limited movement range, wherein an upper limit of the movement range can be set using the setting device and wherein the material outlet, during travel, is pressed by the ground to the upper limit.

Said controlling of a limitation of a position and/or orientation can be carried out using a mechanism which is common for the output unit for said adjusting of position and/or orientation and for setting said working depth.

Said controlling of a limitation of a position and/or orientation can be carried out using a central setting mechanism which is common for the agricultural implement for setting the working depth.

BRIEF DESCRIPTION OF THE DRAWINGS

FIGS. 6*a*-6*b* show a seed outlet viewed in perspective and as an exploded view.

FIGS. 7*a*-7*b* show a seed control part, viewed from the side and from above, respectively.

FIGS. 8*a*-8*b* show a set of furrow openers viewed in perspective obliquely rearward and viewed from above, respectively.

DETAILED DESCRIPTION

Figure 1:
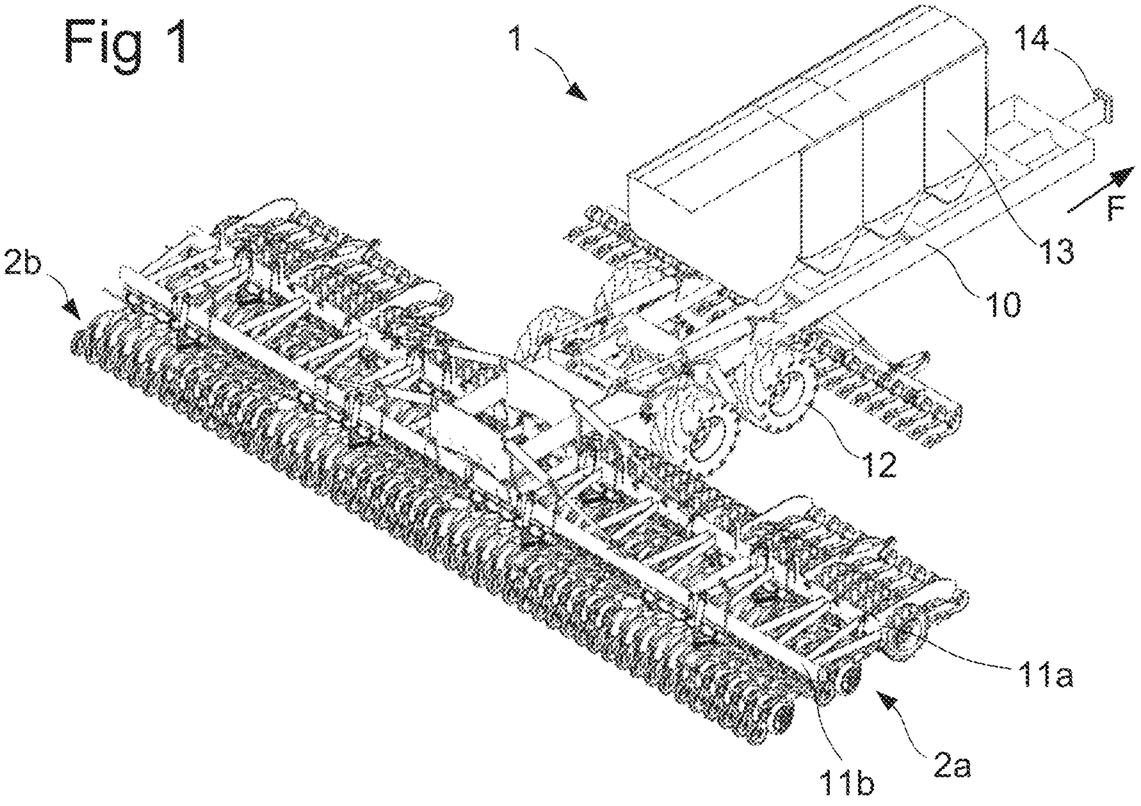
FIG. 1 shows a schematic perspective view of an agricultural implement in the form of a seed drill with a number of furrow openers.

FIG. 1 shows an agricultural implement 1 in the form of a seed drill, which comprises a frame, which has at least a longitudinal frame portion 10 and at least one transverse frame portion 11*a*, 11*b*. In the example shown, the seed drill has a front transverse frame portion 11*a*, which supports a set 2*a* of front furrow openers and a rear transverse frame portion 11*b*, which supports a set 2*b* of rear furrow openers.

The agricultural implement has at least a wheel 12, a seed container 13 and a draw coupling 14, by means of which the agricultural implement can be coupled to a tractor vehicle, such as a tractor, to be drawn in a direction of travel F.

In the example shown, the agricultural implement is formed by a seed drill, and especially a seed drill for volumetric feeding of seed. Such seed drills are traditionally used for sowing cereals, such as wheat, oat, rye or corn.

The concepts shown herein can also be applied to precision seed drills and to other types of machines for feeding material, especially granular material, to the ground on which the agricultural implement is travelling.

The agricultural implement 1 frame can comprise one or more side portions, which can be foldable between a working mode and a transport mode. For example, the agricultural implement can have two, three, four or five portions which in the working mode are located next to one another, and each can carry a plurality of ground-engaging tools, such as output units (furrow openers, row units, fertilizer openers), but also levelling tools, flattening tools, cultivator tines, etc.

Such side portions can be foldable about one or more axes which are substantially parallel to the direction of travel and preferably horizontal.

Thus, the transverse frame portions 11*a*, 11*b* can be divided into a plurality of sections, where each section supports a plurality of output units.

Furthermore, the agricultural implement frame can comprise one or more front portions and/or rear portions pivotable or foldable in relation to a centre portion. For example, a front portion can comprise levelling tools and a rear portion can comprise compacting tools, such as any form of packer.

For agricultural implements with two or more side portions, each side portion can have a front portion and/or a rear portion which can be foldable with the respective side portions.

The agricultural implement shown in FIG. 1 has a large number of furrow openers 21*a*, 21*b*, which are arranged along two separated rows in the direction of travel F. The furrow openers 21*a* in a front set 2*a* can be displaced laterally in relation to the furrow openers 21*b* in a rear set 2*b*, so that a greater row density can be provided than would be allowed by the width of the output units if all output units were located on the same row. The displacement can be in the region of 40-60% of a distance between two adjacent output units in any of the rows.

All furrow openers 21*a* in the front set 2*a* can each substantially be identically designed.

In the same way, all furrow openers 21*b* in the rear set 2*b* can each substantially be identically designed.

Furthermore, the furrow openers 21*b* in the rear set 2*b* can substantially be designed in mirror image in relation to the furrow openers 21*a* in the front set 2*a*.

Figure 2A:
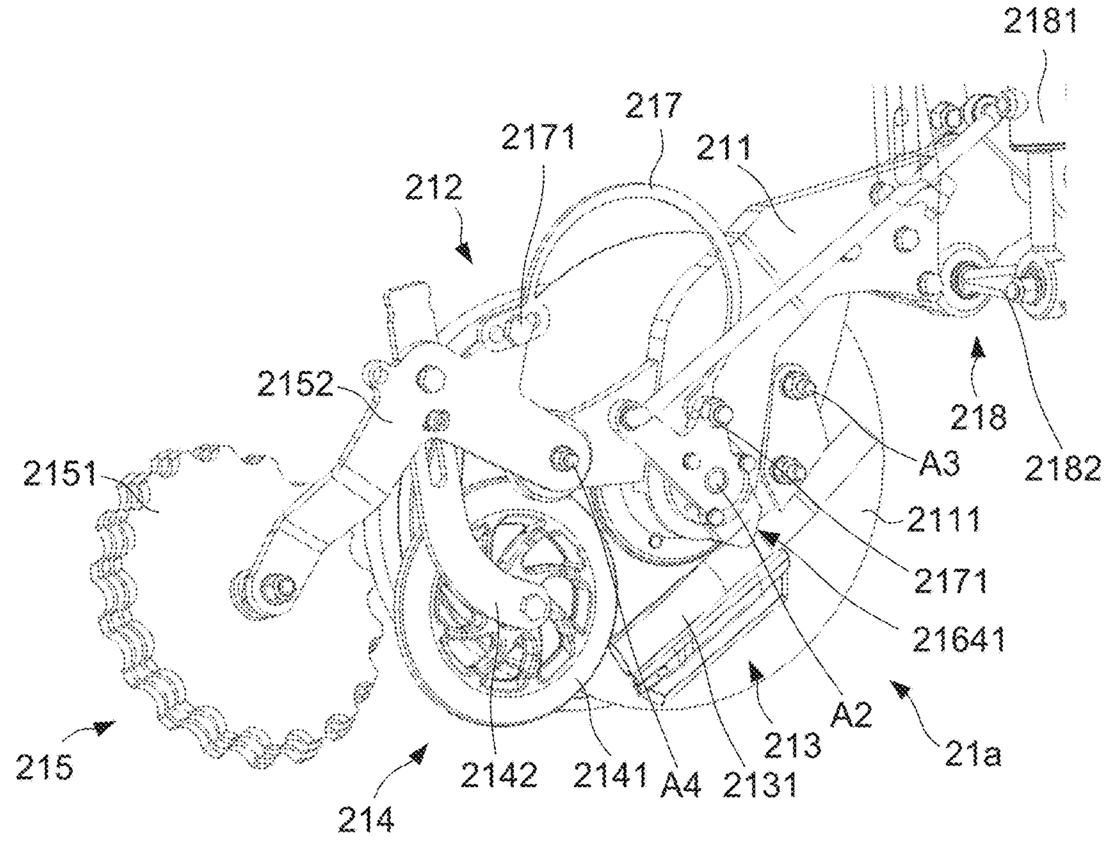
FIGS. 2*a*-2*c* show a furrow opener viewed obliquely rearward, from above and as an exploded view, respectively.
Figure 2B:
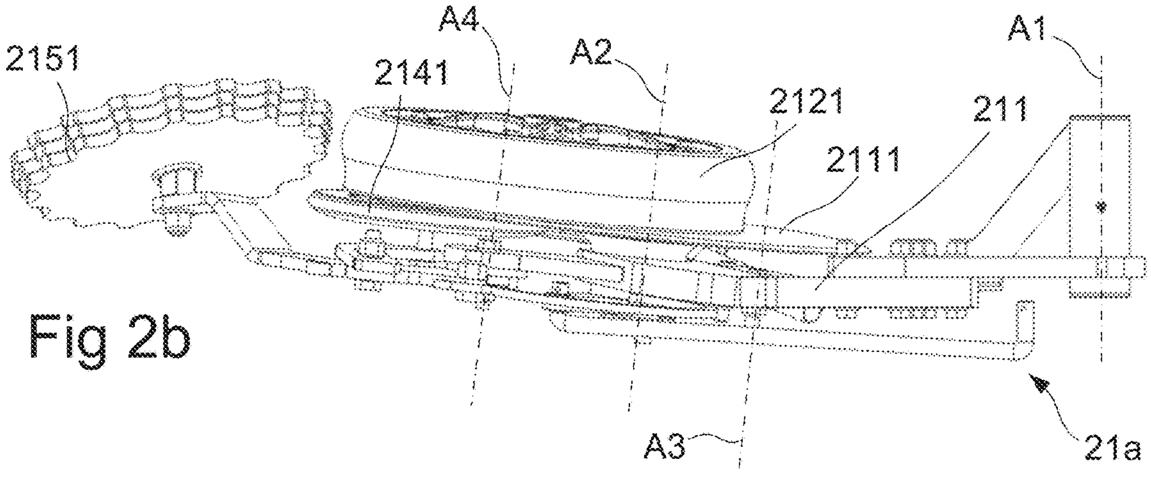

In FIGS. 2*a*-2*b*, an example is shown on an output unit in the form of a furrow opener 21*a*, which is pivotably attachable to a frame portion 11*a* of the agricultural implement 1. The furrow opener 21*a* has a unit frame 211, which can have a mainly two-dimensional, and possibly elongate, extension. At a front portion of the unit frame 211, a frame mount 2114 for pivotable attachment is present relative to the frame portion 11*a*, 11*b*, so that the furrow opener 21 is pivotable relative to the frame portion 11*a*, 11*b* about a first pivot axis A1. The first pivot axis can be substantially horizontal and parallel to the frame portion 11*a*, 11*b*. At the frame mount 2114, the output unit 21*a*, 21*b* can be freely pivotably supported relative to the frame portion 11*a*, 11*b*.

At a distance from the frame mount 2114, attachments for seed discs 2111, depth regulators 212, press wheel devices 214 and sealer devices 215 can exist, where such devices are present.

An attachment for seed discs 2111 can be arranged at a rear and lower portion of the unit frame 211. Attachments for press wheel devices 214 and/or sealer devices 215 can be arranged at a rear and upper portion of the unit frame 211.

The seed disc 2111 can be rotatably attached to the unit frame 211, so that this is rotatable about a second pivot axis A2, which can form an acute angle with the first pivot axis A1. The angle between the first and second pivot axes A1, A2 can be approximately 1-30 degrees, preferably approximately 1-20 degrees or approximately 1-10 degrees, viewed in a horizontal plane.

Figure 2C:
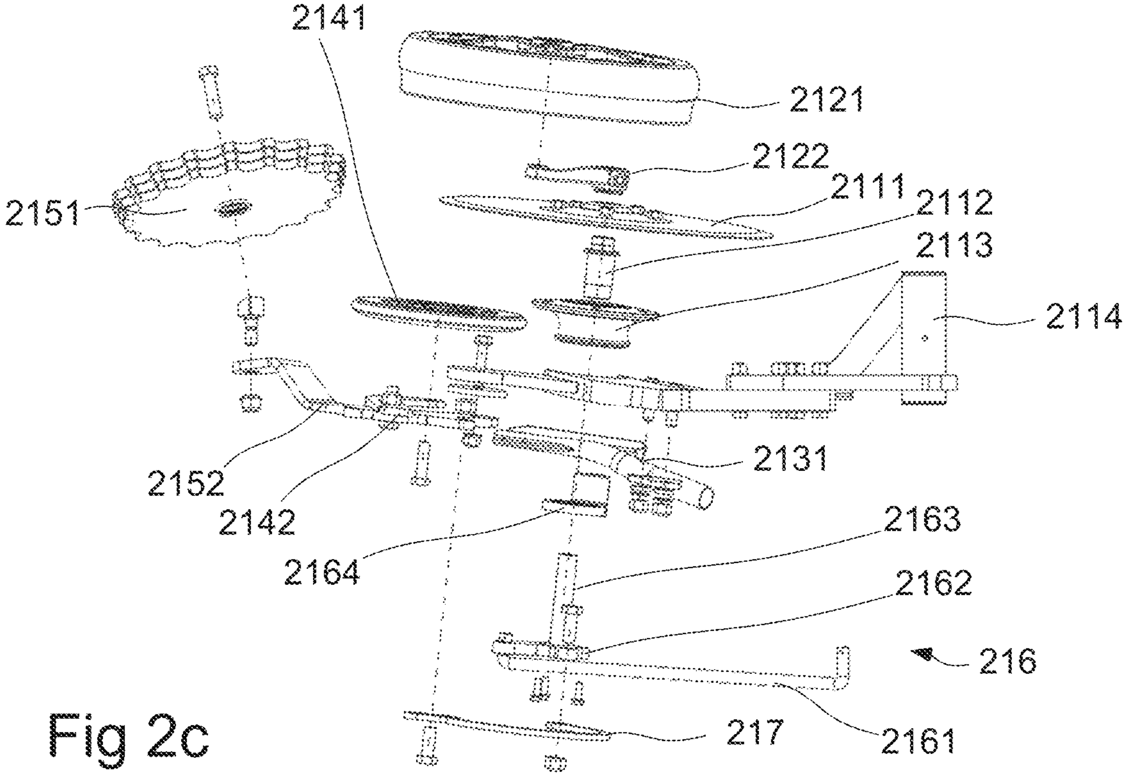

With reference to FIG. 2*c*, the seed disc 2111 can be freely rotatably attached relative to the unit frame 211 via a bearing hub 2113. The bearing hub 2113 can be received in a recess or in a through-hole in the unit frame 211.

The depth regulator 212 can comprise a gauge wheel 2121, which can be freely rotatably supported at a free end of a gauge arm 2122. The gauge arm can be pivotable about the second pivot axis A2 and fixedly connected to a setting axis 2163, so that the pivotal position of the gauge arm 2122 is adjustable using a setting device 216.

The setting device 216 can comprise the setting axis 2163, which is pivotably arranged relative to the unit frame 211, so that the setting device 216 is pivotable about the second pivot axis A2.

The setting part 2162 can be fixedly connected to the setting axis 2163, so that the setting part 2162 and the gauge arm 2122 are fixedly arranged relative to each other and pivotable about the second pivot axis A2. The setting part 2162 can comprise an arm, at which a setting link 2161 is pivotably connected for controlling the setting device 216.

The setting axis 2163 can extend through the bearing hub 2113, so that the setting part 2162 is situated on one of the axial sides of the bearing hub 2113 and so that the gauge arm 2122 is situated on the second, opposite, axial side of the bearing hub 2113.

The setting part 2162 can comprise a cam part 2164, which can be fixable to the setting part 2162, so that the cam part 2164 and the setting part 2162 are fixedly arranged with respect to each other, wherein the cam part 2164 is pivotable together with the setting part 2162 about the second pivot axis A2.

A material outlet 213 is moveably attached relative to the unit frame 211, preferably pivotable about an axis A3 which can be parallel to the second pivot axis A2. The material outlet 213 can be connected via a pipe or a hose to a material container 13, possibly via a distributor device, designed to distribute material from the container 13 using an air flow to a plurality of output units 21*a*, 21*b*. The material outlet 213 can comprise a pipe 2131, such as a sowing pipe.

The material outlet 213 will be described further with reference to FIGS. 7*a*-7*b*.

The cam part 2164 can have a cam surface 21641 in slidable engagement with a surface 2137 facing the cam part of the material outlet 213, so that the position of the material outlet is limited upward by the cam part. The cam part can have such a form that a position for an upper limitation position for the material outlet is dependent on the pivotal position of the cam part about the second pivot axis A2.

A distance between the second pivot axis A2 and a contact point between the cam part 2164 and the material outlet 213 can thus be set by pivoting the cam part 2164 about the second pivot axis A2.

The cam surface 21641, or the entire cam part 2164, can be made of a soft material, such as polymer material, to reduce wear on the material outlet 213.

The pressure device 214 can comprise a press wheel 2141, which can be freely rotatably supported on a press wheel arm 2142. The press wheel 2141 can be positioned directly behind the material outlet 213, viewed in the direction of travel, so that output material is caught by the press wheel 2141 and pressed into contact with the soil.

The press wheel arm 2142 can be moveably, and in particular pivotably, attached to the unit frame 211, so that the height position of the press wheel in relation to the unit frame 211 and/or in relation to the gauge wheel is adjustable.

Furthermore, the press wheel arm 2142 can be moveably, and in particular pivotably, attached to the unit frame 211, so that the position of the press wheel along the direction of travel F in relation to the unit frame 211 and/or in relation to the material outlet 213 is adjustable.

The sealer device 215 can comprise a sealer wheel 2151, which can be freely rotatably supported on a sealer arm 2152. The sealer wheel 2151 can be arranged to rotate about an axis which forms an acute angle to the first pivot axis A1, and which also forms an acute angle to a horizontal plane, so that the sealer wheel has a side whose surface normal points obliquely upward and forward, so that it can move soil laterally to cover a seed furrow formed by the seed disc 2111.

The sealer arm 2152 can be moveably, and in particular pivotably, attached to the unit frame 211, so that the height position of the sealer wheel in relation to the unit frame 211 and/or in relation to the gauge wheel is adjustable.

In the example shown, the press wheel arm 2142 and the sealer arm 2152 are fixedly connected to each other and pivotable relative to the unit frame about a fourth pivot axis A4, which can be parallel to the second pivot axis A2.

Figure 3A:
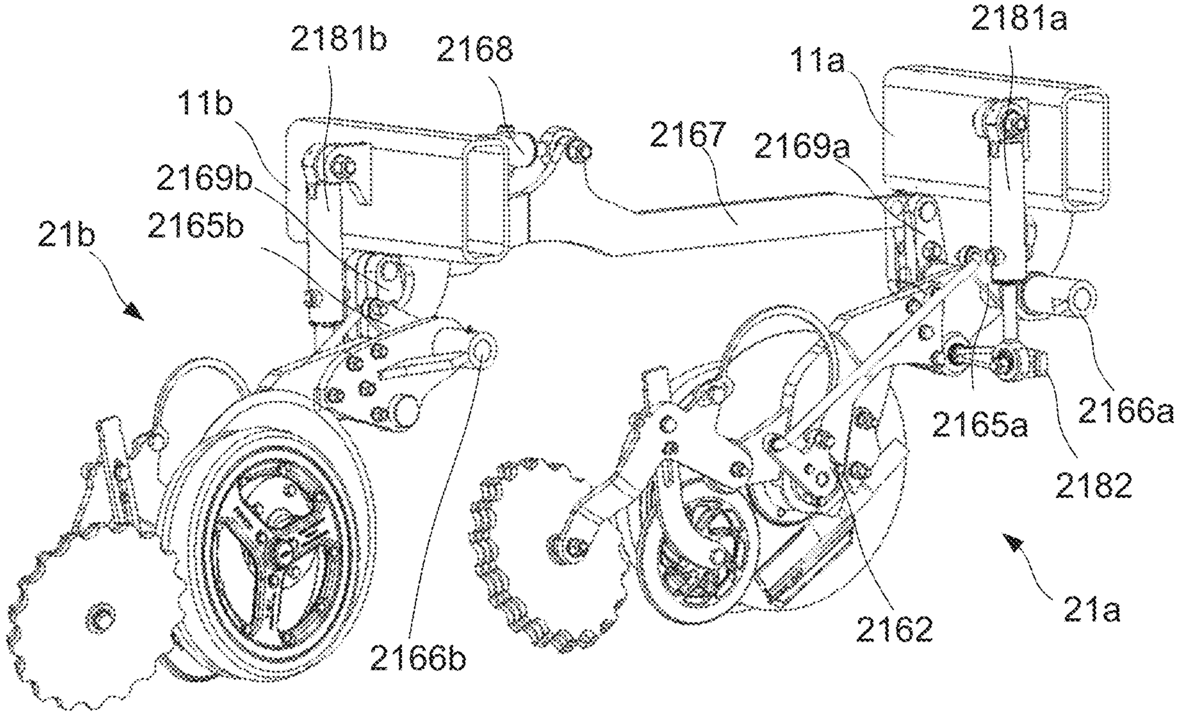
FIGS. 3*a*-3*c* show a pair of interconnected furrow openers, viewed obliquely rearward, from above and from the side, respectively.
Figure 3B:
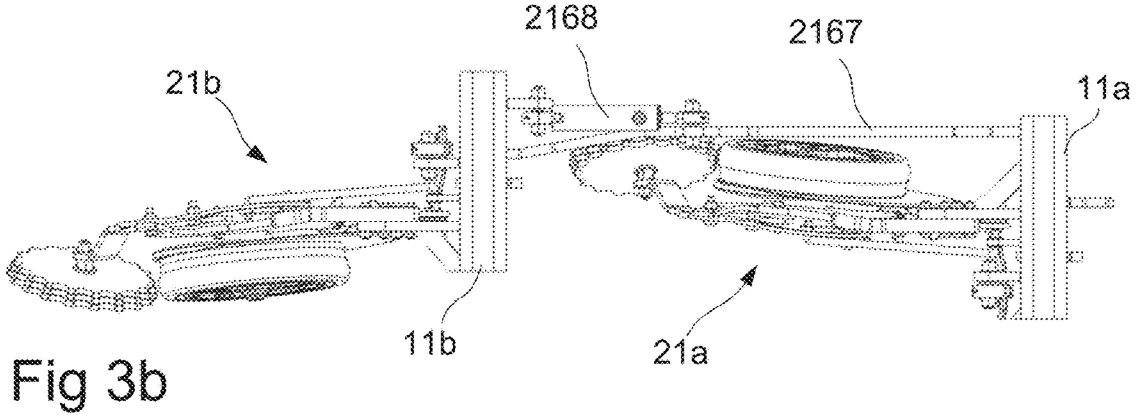
Figure 3C:
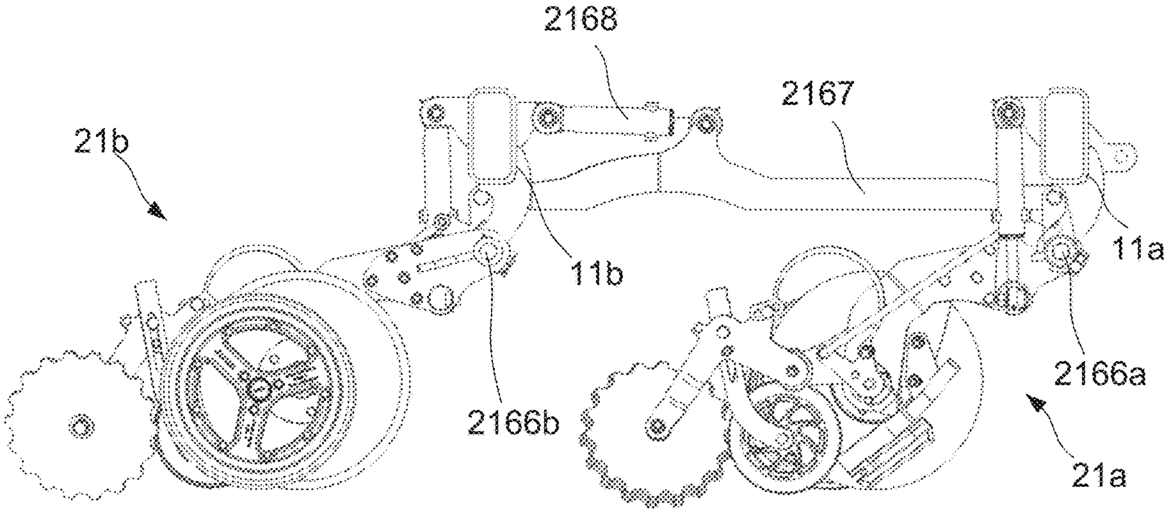

In FIGS. 3*a*-3*c*, a pair of furrow openers 21*a*, 21*b* is shown, having a common control arrangement for controlling a working depth.

The control arrangement can comprise a depth-regulating cylinder 2168, which is connected to a control link 2167, which via a control link arm 2169 acts on one or more control shafts 2166*a*, 2166*b*.

The depth-regulating cylinder 2168 can be a hydraulic cylinder, which can act between a frame portion, here a rear transverse frame portion 11*b*, and the control link 2167. In the example shown, the control link 2167 extends between a rear control link arm 2169 associated with a rear control shaft 2166*b* and a front control link arm 2169 associated with a front control shaft 2166*a*.

Each control link arm 2169*a*, 2169*b* is, at a proximal portion thereof, fixedly attached to the control shaft 2166*a*,

2166*b*, wherein a control link 2167 is pivotably attached to a distal portion of the control link arm 2169*a*, 2169*b*.

A control arm 2165 associated with the furrow opener 21*a*, 21*b* is fixedly arranged on the control shaft 2166*a*, 2166*b* and connected to the setting link 2161. Each control arm 2165, 2165*a*, 2165*b* is, at a proximal portion thereof, fixedly attached to the control shaft 2166, wherein the setting link 2161 is pivotably attached to a distal portion of the control arm 2165, 2165*a*, 2165*b*.

At least one of the press wheel arm 2142 and the sealer arm 2152 can be connected to the setting part 2162 via a link part 217, which here is formed as a spring.

The spring can have a spring mount 2171 on the setting part 2162, which is located at a distance from the second pivot axis A2, so that an arm is provided.

Furthermore, the spring can have a spring mount 2172 on the press wheel arm 2142 or on the sealer arm 2152, which is located at a distance from the fourth pivot axis A4.

In the example shown, the link part 217 is shown as a spring, which can be compressed or expanded along a line between the spring mounts.

Thus, a certain relative movement between the sealer wheel/press wheel and the setting device 216 can be allowed. The type of spring can be selected on the basis of the space available in the structure.

Operating the depth-regulating cylinder 2168 brings the control link 2167 to provide substantially the same movement of the front and rear control link arms 2169. Thus, the same pivotal movement is also provided for the front and rear control shafts 2166*a*, 2166*b*.

Pivoting a control shaft 2166*a*, 2166*b* causes pivoting the respective control arm 2165 associated with the furrow opener 21*a*, 21*b*. A control shaft can thus be operated for controlling the working depth for a plurality of furrow openers arranged along the control shaft and connected thereto.

The pivotal movement of the control arm 2165 is transferred to a pivotal movement of the setting part 2162 using the setting link 2161.

The furrow openers 21*a*, 21*b* can be freely pivotably supported on the control shaft 2166*a*, 2166*b*. A ground pressure cylinder 2181*a*, 2181*b* operating between a frame portion, here the respective transverse frame portion 11*a*, 11*b*, and at least a furrow opener 21*a*, 21*b*, can be arranged for setting a pressure which the furrow opener will exert on the ground.

In the arrangement shown, each ground pressure cylinder 2181*a*, 2181*b* is arranged to control ground pressure for two adjacent furrow openers 21*a*, 21*b*, by means of the ground pressure cylinder 2181*a*, 2181*b* acting on a transverse link 2182 extending between the adjacent furrow openers.

The transverse link 2182 can be pivotably attached to the respective furrow opener, so that the adjacent furrow openers can have different pivotal positions about the control shaft 2166*a*, 2166*b*.

Figure 4A:
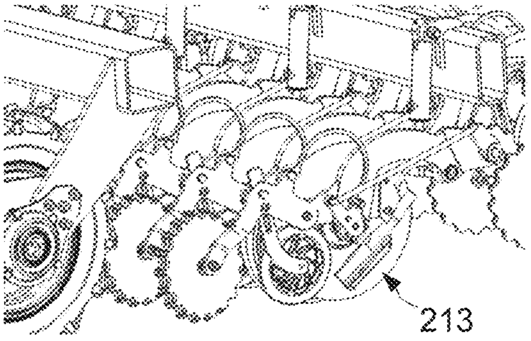
FIGS. 4*a*-4*b* show a set of furrow openers viewed in perspective obliquely rearward and one of said furrow openers viewed from the side, respectively, in a first working mode.
Figure 4B:
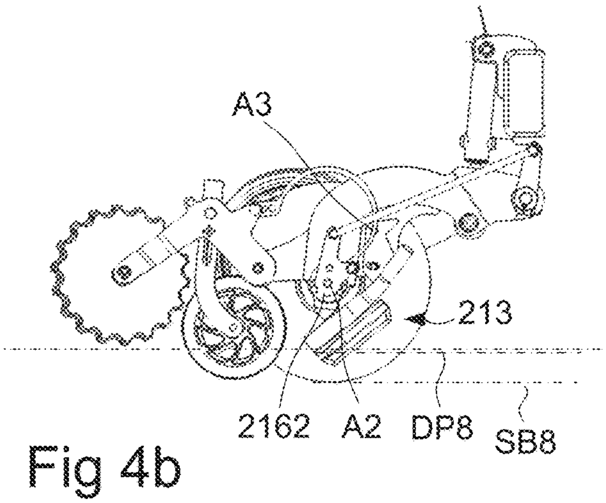

In FIGS. 4*a*-4*b*, a furrow opener 21*a* is shown in a first working position, where a great working depth is provided. As an example, a working depth of 8 cm is shown.

Figure 5A:
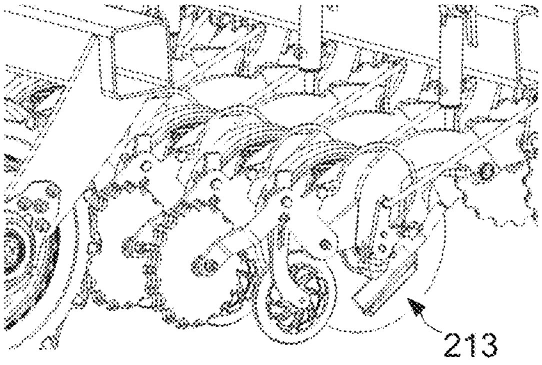
FIGS. 5*a*-5*b* show a set of furrow openers viewed in perspective obliquely rearward and one of said furrow openers viewed from the side, respectively, in a second working mode.
Figure 5B:
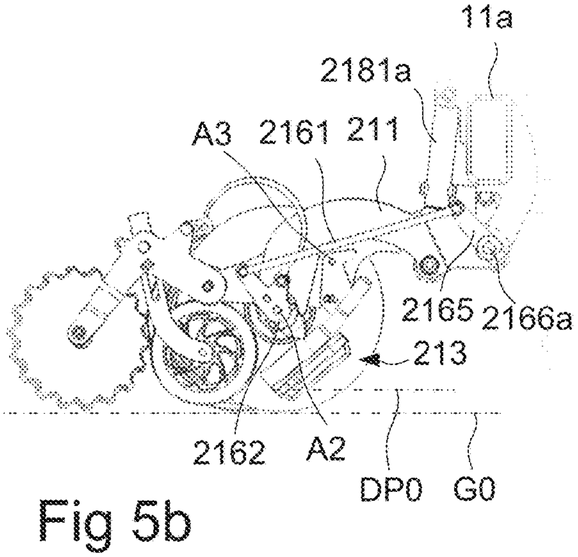

In FIGS. 5*a*-5*b*, a furrow opener 21*a* is shown in a second position, where a small working depth is provided. As an example, a working depth of 0 cm is shown.

In FIGS. 4*a*-4*b* and 5*a*-5*b* "ground level" is indicated, i.e. the level the gauge wheel 2121 is set to, with reference designation G0. The delivery point for the material outlet is indicated with reference designation DP8 in FIGS. 4*a*-4*b* and with reference designation DP0 in FIGS. 5*a*-5*b*.

As will best be seen in a comparison between FIG. 4*b* and FIG. 5*b*, the setting part 2162 is situated, in FIG. 4*b*, in a first pivotal position and, in FIG. 5*b*, in a second pivotal position.

In the first pivotal position (FIG. 4*b*), which is intended for a great working depth, the distance between the second pivot axis A2 and the material outlet 213 is minimal. Thus, the material outlet is allowed to occupy a position which places the delivery point DP8 as high as possible in relation to the bottom SB8 of the seed furrow.

In this position, the material outlet is therefore retracted as high as possible, in order to not engage with the ground, wherein the wear of the material outlet is minimized, as is the friction of the material outlet against the ground, and the consequent traction force requirement.

In the second pivotal position (FIG. 5*b*), which is intended for a small working depth, the distance between the second pivot axis A2 and the material outlet 213 is minimal. Thus, the material outlet is brought to occupy a position which places the delivery point DP0 as low as possible in relation to the bottom of the seed furrow, which in FIG. 5*b* coincides with the ground surface G0.

In this position, the material outlet is therefore as low as possible, in order to engage with the ground to remove such ground which the seed furrow-opener has not successfully removed, and thus ensuring that a suitable furrow is formed.

As can be seen in FIGS. 4*b* and 5*b*, the material outlet 213 is pivotably attached to the unit frame 211, so that pivoting is possible about the third pivot axis A3.

FIGS. 6*a*-6*b* show detail views of the material outlet 213. The material outlet can comprise a pipe 2131, one end of which has an orifice defining a delivery point DP. The other end of the pipe 2131 can be attachable via for example a hose to a material source, such as a distributor or a singulator (not shown). Furthermore, the material outlet 213 can comprise a wear-resistant cutting blade 2132, such as a hard metal cutter, the function of which is to protect the pipe 2131 from the abrasive effect of the ground. The cutting blade 2132 can be arranged to extend along the pipe, across at least a part of its front side and/or underside. The function of the cutting blade 2132 can also be to ensure engagement with the ground, in order to remove such ground which cannot be removed by the seed furrow-opener and/or in order to remove such ground which has had time to collapse since it was opened by the seed furrow-opener.

The material outlet 213 can have a mounting tongue 2133, which can be attached to the pipe 2131 or to the cutting blade 2132 and can be designed for mounting on the unit frame 211.

In the example shown, the mounting tongue 2133 has a first mounting hole 2134 which is circular and intended to be the pivot axis A3. The mounting tongue can also have a guide hole 2135, which can be elongate and possibly curved about the axis A3.

With such a mounting device, the material outlet 213 can be mounted so that it is freely moveable, such as pivotable, relative to the unit frame 211 within a movement range, here an angular interval, which is limited by the length of the guide hole 2135.

Along an upper side of the pipe 2131, a cam surface 2137 is provided, along which the cam part 2164 is slidably contactable. The cam surface 2137 can be provided with a wear-resistant part, such as a hard metal part, or with a replaceable part, such as a plastic part for contacting the cam part 2164.

In the example shown, the cam surface 2137 is formed on a separate seed control part 2136, which is releasably mounted along the upper side of the pipe 2131.

The upper side of the pipe 2131 can have a longitudinal opening, such as a slot, wherein the separate seed control part 2136 can be a cover for this slot.

In FIGS. 7*a*-7*b*, detail views of the separate seed control part 2136 are shown.

The separate seed control part can have ventilation openings 2138, such as small slots, which allow air, but not granular material, to pass therethrough.

Furthermore, the material outlet 213 can have an outwardly extending control part 2139 from an upper side of the orifice, which can be configured to control, in at least one direction, the granular material leaving the pipe 2131.

The control part 2139 can be configured as a part of the separate seed control part 2136, so that the separate part extends outward from the orifice.

FIGS. 8*a*-8*b* show a part of an agricultural implement 1 comprising two portions of transverse frame portions 11*a*, 11*b* and two pairs of furrow openers, wherein a first pair of furrow openers are supported by a front transverse frame portion 11*a* and a second pair of furrow openers are supported by a rear transverse frame portion 11*b*. The front furrow openers 21*a* are arranged with a front common control shaft 2166*a*, and the rear furrow openers 21*b* are arranged with a rear common control shaft 2166*b*.

The front furrow openers 21*a* are connected to the front control shaft 2166*a*, as described above.

The rear furrow openers 21*a* are connected to the rear control shaft 2166*b*, as described above.

A control shaft 2166*a*, 2166*b* can extend across a plurality of adjacently arranged furrow openers, which thus simultaneously can be operated using one or a few depth-regulating cylinders.

A control link 2167 connects the front and rear control shafts, as described above.

A common depth-regulating cylinder 2168 is arranged to act between the rear transverse frame portion 11*b* and the control link 2167.

A front ground pressure cylinder 2181*a* is arranged to control the ground pressure for both the front furrow openers 21*a*.

A rear ground pressure cylinder 2181*b* is arranged to control the ground pressure for both the rear furrow openers 21*b*.

A transverse link 2182*a*, 2182*b* extends between each pair of furrow openers arranged on the same control shaft.

The front ground pressure cylinder 2181*a* can be arranged to act between the front transverse frame portion 11*a* and the front transverse link 2182*a*, so that the front ground pressure cylinder controls the ground pressure for a pair of adjacent furrow openers.

By forming a plurality of pairs of adjacent furrow openers, which have a common ground pressure cylinder, it is possible to reduce the number of ground pressure cylinders and at the same time provide good flexibility for the furrow openers.

With an agricultural implement comprising furrow openers as described above, it is possible to set a height position for a delivery point DP of a material outlet 213, so that the vertical position of the delivery point can be adapted to the working depth of the furrow opener.

According to some embodiments, the height adjustment can be provided by means of the material outlet 213 being freely moveably, such as pivotably, attached relative to the unit frame 211, wherein an end position for the movement is adjustable and wherein the material outlet is moreover freely moveable over a movement range but limited in one direction to a maximum height. The material outlet 213 can be pressed to the limitation by means of the action of the ground when the agricultural implement is driven.

In other embodiments, the material outlet can be pre-tensioned against the limitation, for example using some form of resilient part.

Adjusting the limitation of the height position of the material outlet 213 can take place as one of a setting operation for setting the working depth for the output unit 21*f*, 21*b*. The setting can thus be provided by means of a centrally controlled depth-regulating cylinder 2168 being set to the desired position, wherein a control link 2167 is affected and in turn affects the control shafts 2166*a*, 2166*b*, so that these are pivoted, wherein the setting link 2161 makes the setting part 2162 pivot, so that the cam part as well as the gauge arm 2122 pivot, wherein the working depth is set simultaneously as the top position of the material outlet 213 is set.

By connecting the setting part 2162 with at least one of a press wheel arm 2142 and a sealer arm 2152, the position of the press wheel 2141 and/or the sealer wheel 2151 can also be set to an optimal position for the working depth.

The invention claimed is:

1. An output unit for an agricultural implement, for feeding granular material to the ground on which the agricultural implement is travelling, comprising:

a seed furrow-opener, a depth regulator, for controlling a working depth for the seed furrow-opener, and a material outlet defining a delivery point at which the granular material leaves the material outlet, wherein the material outlet being moveable relative to the seed furrow-opener, so that the delivery point is moveable at least vertically relative to the seed furrow-opener, and further comprising a setting device, for controlling or limiting a height position for the delivery point relative to the seed furrow-opener wherein the depth regulator is moveable relative to the seed furrow-opener, so that the working depth is adjustable, wherein the setting device is configured to simultaneously set a height position for the depth regulator relative to the seed furrow-opener and to control or limit said height position for the delivery point, and wherein the setting device comprises a setting part which is pivotal about a first pivot axis, and wherein the material outlet is moveably attached relative to a unit frame of the seed furrow-opener, and wherein the material outlet is freely moveable relative to the unit frame within a limited movement range, and wherein the material outlet is pre-tensioned against the setting part.

2. The output unit according to claim 1, further comprising a setting link, which is connected to a portion of the setting part located at a distance from the first pivot axis, so that a torque about the first pivot axis is applicable using a force along the setting link.

3. The output unit according to claim 1, wherein the setting part is configured to limit said movement range in at least one direction.

4. The output unit according to claim 1, wherein the setting part has a cam surface, wherein the movement of the material outlet in at least one direction relative to the unit frame is limited by contact against the cam surface, and wherein a distance between the first pivot axis and a portion of the cam surface, contacting the material outlet, is variable by pivoting the setting part.

5. The output unit according to claim 1, wherein the depth regulator comprises a gauge wheel which is rotatably supported on a gauge arm, which is pivotable using a setting axis.

6. The output unit according to claim 1, further comprising a pressure device, which is arranged directly behind the material outlet, viewed in the direction of travel, to receive and/or press the material to the ground, wherein the pressure device comprises a press wheel rotatably supported on a press wheel arm.

7. The output unit according to claim 1, wherein the material outlet comprises a pipe with a wear-resistant cutting blade extending along the pipe, along a front and/or an underside thereof.

8. The output unit according to claim 7, wherein the material outlet has a cam surface extending along an opposite side to the cutting blade of the pipe.

9. The output unit according to either claim 7, wherein the pipe has an orifice defining the delivery point and a control part extending past the orifice.

10. The output unit according to claim 1, wherein the material outlet has a ventilation opening arranged upstreams of the delivery point, and wherein the ventilation opening is configured as one ore more slots.

11. The output unit according to claim 1, wherein the material outlet has a mounting arrangement, through which the material outlet can be mounted so that the material outlet is pivotable over a limited angular interval.

12. The output unit according to claim 1, wherein the setting device is configured to set the material outlet so that the delivery point is positioned closer to a seed furrow bottom at a smaller working depth than at a greater working depth.

13. An agricultural implement, comprising an implement frame and a plurality of output units according to claim 1, which is moveably arranged along at least one transverse frame portion of the implement frame.

14. The agricultural implement according to claim 13, further comprising a depth control arrangement arranged on the implement frame, wherein the setting device of the respective output unit is operatively connected to the depth control arrangement, so that the height position of the delivery point is adjustable in a synchronized manner for a number of said output units.

15. The agricultural implement according to claim 14, wherein the implement frame comprises a front transverse frame portion supporting a front output unit, and a rear transverse frame portion supporting a rear output unit, and a mechanical connection between the setting device of the front output unit and the setting device of the rear output unit, so that the front output unit and said rear output unit are controllable by means of a common actuator.

16. A method of operating an agricultural implement, comprising:

providing an output unit for feeding granular material to the ground on which the agricultural implement is travelling, which comprises a seed furrow-opener, a depth regulator, for controlling a working depth for the seed furrow-opener, and a material outlet defining a delivery point at which the granular material leaves the material outlet, wherein the material outlet is moveably attached relative to a unit frame of the seed furrow-opener, and wherein the material outlet is freely moveable relative to the unit frame within a limited movement range, and wherein the material outlet is pretensioned against the setting part, and controlling or limiting a position and/or orientation of the material outlet relative to the seed furrow-opener by a setting device, and thus a height position for the delivery point relative to the seed furrow-opener, wherein the setting device comprises a setting part which is pivotal about a first pivot axis;

wherein said controlling or limitation of a position and/or orientation is carried out using a central setting mechanism which is common for the output unit for said adjusting of position and/or orientation and for setting said working depth.

17. The method according to claim 16, wherein controlling or limiting a position and/or orientation of the material outlet relative to the seed furrow-opener comprises setting the material outlet so that the delivery point is positioned closer to a seed furrow bottom at a smaller working depth than at a greater working depth.

* * * * *